United States Patent [19]

Bhagat et al.

[11] Patent Number: 5,651,050

[45] Date of Patent: *Jul. 22, 1997

[54] GROUND-TO-AIR TELEPHONE CALLING SYSTEM AND RELATED METHOD FOR ESTABLISHING A TELEPHONE LINK BETWEEN A GROUND-BASED CALLER AND A PASSENGER ON BOARD AN AIRCRAFT

[75] Inventors: Jai P. Bhagat; William D. Hays, both of Jackson; Ernest A. Oswalt, Raymond, all of Miss.

[73] Assignee: Mobile Telecommunication Technologies, Jackson, Miss.

[*] Notice: The term of this patent shall not extend beyond the expiration date of Pat. No. 5,408,515.

[21] Appl. No.: 433,537

[22] Filed: May 2, 1995

Related U.S. Application Data

[63] Continuation of Ser. No. 246,089, May 19, 1994, Pat. No. 5,438,610, which is a continuation of Ser. No. 226,394, Apr. 12, 1994, Pat. No. 5,408,515, which is a continuation of Ser. No. 980,756, Nov. 24, 1992, abandoned, which is a continuation-in-part of Ser. No. 759,626, Sep. 16, 1991, Pat. No. 5,278,891, which is a continuation of Ser. No. 501,430, Mar. 22, 1990, abandoned, which is a continuation of Ser. No. 188,557, Apr. 29, 1988, Pat. No. 4,849,303.

[51] Int. Cl.$^6$ .................................................... H04Q 7/38
[52] U.S. Cl. ................................................................ 455/431
[58] Field of Search .............................. 379/58, 59, 63, 379/62; 455/12.1, 13.1, 56.1, 33.1; 340/825.44; 370/120; 358/86

[56] References Cited

U.S. PATENT DOCUMENTS

| | | | |
|---|---|---|---|
| 4,835,604 | 5/1989 | Kondo et al. | 358/86 |
| 4,866,515 | 9/1989 | Tagawa et al. | 358/86 |
| 4,903,298 | 2/1990 | Cline | 379/62 |
| 5,278,891 | 1/1994 | Bhagat et al. | 379/58 |
| 5,408,515 | 4/1995 | Bhagat et al. | 379/59 |
| 5,438,610 | 8/1995 | Bhagat et al. | 379/58 |

OTHER PUBLICATIONS

Ambit System, Incorporated, "Airborne Telecommunications Ssystem Description" Jul. 1991.

*Primary Examiner*—William Cumming
*Attorney, Agent, or Firm*—Finnegan, Henderson, Farabow, Garrett and Dunner, L.L.P.

[57] ABSTRACT

A ground-to-air telephone calling system is provided including a computer for receiving an airborne telephone number and a call-back number from a calling party and forming the telephone numbers into a data signal comporting with existing protocol filed in the FCC, an uplink unit for uplinking the data signal to a satellite and a plurality of downlink stations for receiving the data signal from the satellite; a plurality of ground stations corresponding to each of the downlink units for receiving the data signals and passing a call signal identifying the airborne telephone and particular ground station to a corresponding transmit/receive unit for subsequent transmission to the aircraft; a call being initiated from the ground station to the calling party over the public switched telephone network if the aircraft responds to the call signal. An alternative embodiment provides for a plurality of telephones on board the aircraft, and is capable of directing a call from a ground based caller to a particular telephone assigned to a passenger on the aircraft.

2 Claims, 12 Drawing Sheets

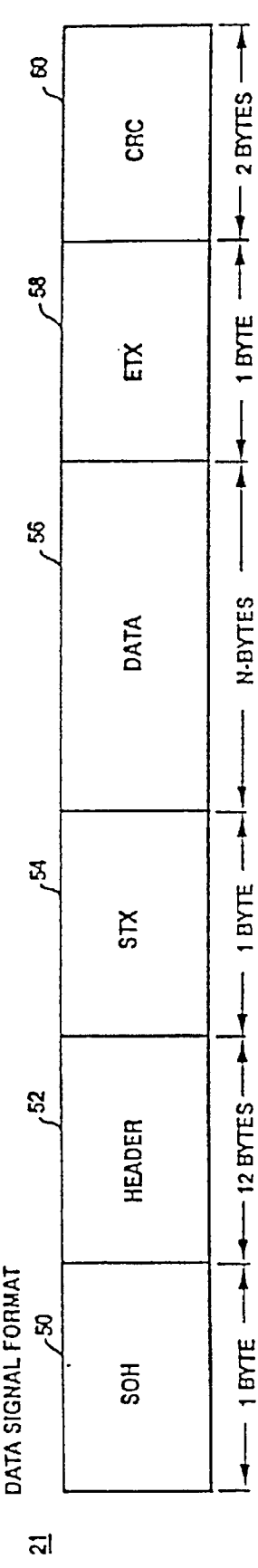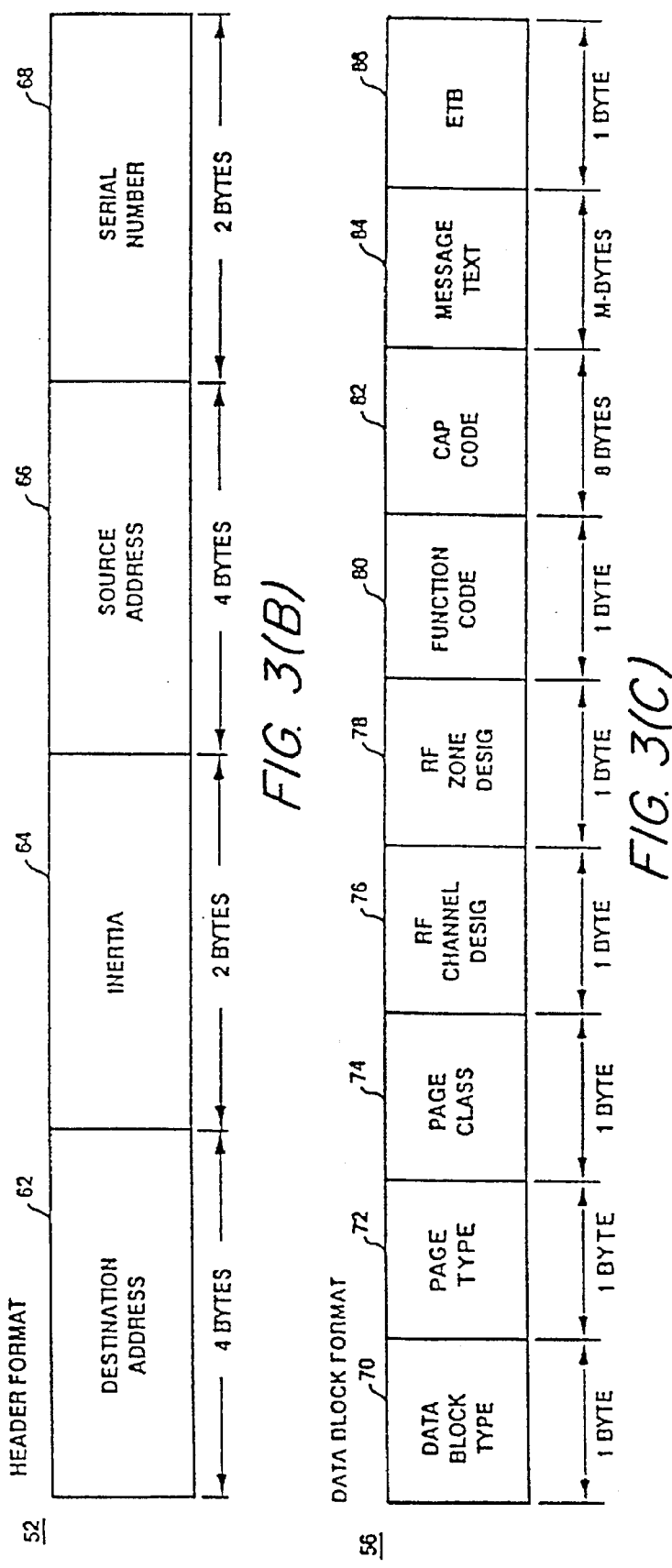

GROUND-TO-AIR TELEPHONE CALLING SYSTEM AND RELATED METHOD FOR ESTABLISHING A TELEPHONE LINK BETWEEN A GROUND-BASED CALLER AND A PASSENGER ON BOARD AN AIRCRAFT

This is a continuation of application Ser. No. 08/246,089, filed May 19, 1994 now U.S. Pat. No. 5,438,610, which is a continuation of Ser. No. 08/266,394, filed Apr. 12, 1994 and issued as U.S. Pat. No. 5,408,515 on Apr. 18, 1995, which is a continuation of Ser. No. 07/980,756, filed Nov. 24, 1992 now abandoned, which is a continuation-in-part of Ser. No. 07/759,626, filed Sep. 16, 1991 and issued as U.S. Pat. No. 5,278,891 on Jan. 11, 1994, which is a continuation of Ser. No. 07/501,430, filed Mar. 22, 1990 now abandoned, which is a continuation of Ser. No. 07/188,557, filed Apr. 29, 1988 now U.S. Pat. No. 4,849,303.

BACKGROUND OF THE INVENTION

1. Field of the Invention

The present invention relates to a ground-to-air telephone system which permits a ground based caller to establish telephonic communication with an airborne telephone of unknown location.

2. Background Information

Airborne telephone systems are well known and widely used. Such systems are typically utilized by a passenger on an aircraft to initiate a telephone call to a ground based party connected to the public switched telephone network (PSTN). Through such systems, an airborne party can initiate telephone calls to any telephone in the world. Such calls are transmitted from the airborne telephone to ground stations which route the telephone calls byway of the PSTN to the called party.

However, if a ground based party wishes to call an airborne telephone using such a system, the ground based party most know which specific ground station is within transmission range of the aircraft. This requirement necessitates that the ground based party know the particular location of the aircraft at any given time, thereby presenting prohibitive mapping requirements. As a result, ground-to-air telephone calls are seldom attempted because of the infeasibility of knowing the particular location of an aircraft at any given time.

Mobile ground telephone systems, such as cellular systems, are known, wherein a central location coordinates the selection of calls, i.e., the central location selects which ground station is in communication with the mobile telephone and routes and completes the call accordingly. Such mobile ground systems are inadequate for airborne use, however, because the use of such a central location in airborne applications causes inadequate contention between ground stations for the selection of channel frequencies.

SUMMARY OF THE INVENTION

In view of the foregoing, an object of the present invention is to provide a ground-to-air telephone system by which a ground based caller can initiate a telephone call to an airborne telephone of unknown location.

An additional object of the present invention is to provide a ground-to-air telephone system in which no modifications or variations are required to known airborne telephones.

Another object of the present invention is to permit selected activation of ground stations to provide a ground-to-air telephone system with regional or national extent.

A further object of the present invention is to eliminate contention between ground stations for channel frequencies.

A further object of the present invention is to provide a ground-to-air telephone system for a multi-telephone configuration on board an aircraft.

A further object of the present invention is to provide a ground-to-air telephone system capable of directing a call to a particular passenger.

To achieve the foregoing desires and objects, and in accordance with the purposes of the invention as embodied and broadly described herein, the present invention provides a system for establishing a communication link between a ground-based caller and a passenger on board an aircraft, the aircraft having a plurality of telephones, the system comprising a device for assigning a traveler assigned number (TAN) to the passenger, the TAN comprising a code to uniquely identify the passenger; a device for assigning an aircraft identification number (AIN) to the aircraft, the AIN comprising a code to uniquely identify the aircraft; a first correlation device for correlating the passenger's TAN to a predetermined seat assignment on the aircraft; a device for generating a data signal in response to a telephone call to the passenger from the caller, the data signal including the passenger's seat assignment, the aircraft AIN, and the caller's telephone number; a signal transmitting and receiving network for receiving the data signal and transmitting a call signal over a predetermined geographic area, the call signal including the passenger's seat assignment; a device, on board the aircraft, for receiving the call signal; a second correlation device, on board the aircraft and responsive to the seat assignment information in the call signal, for correlating the call signal with a predetermined telephone on board the aircraft; a switching device, on board the aircraft and responsive to the second correlation device for establishing a call connection to the predetermined telephone; a device, on board the aircraft and responsive to the call signal, for transmitting a response signal and a device, included in the signal transmitting and receiving network and responsive to the response signal, for calling the caller's telephone number and completing a communication link to the caller when the caller answers the telephone call.

Additional desires and objects of the invention will be set forth in the description which follows, and in part will be apparent from the description, or may be learned by practice of the invention. The advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred implementations of this invention and, together with the general description given above and the detailed description of the preferred implementations given below, serve to explain the principles of the invention.

FIGS. 3a–3c are diagrams illustrating the formats of particular signals used in the system of FIG. 1;

DESCRIPTION OF THE PREFERRED EMBODIMENT

Figure 1:
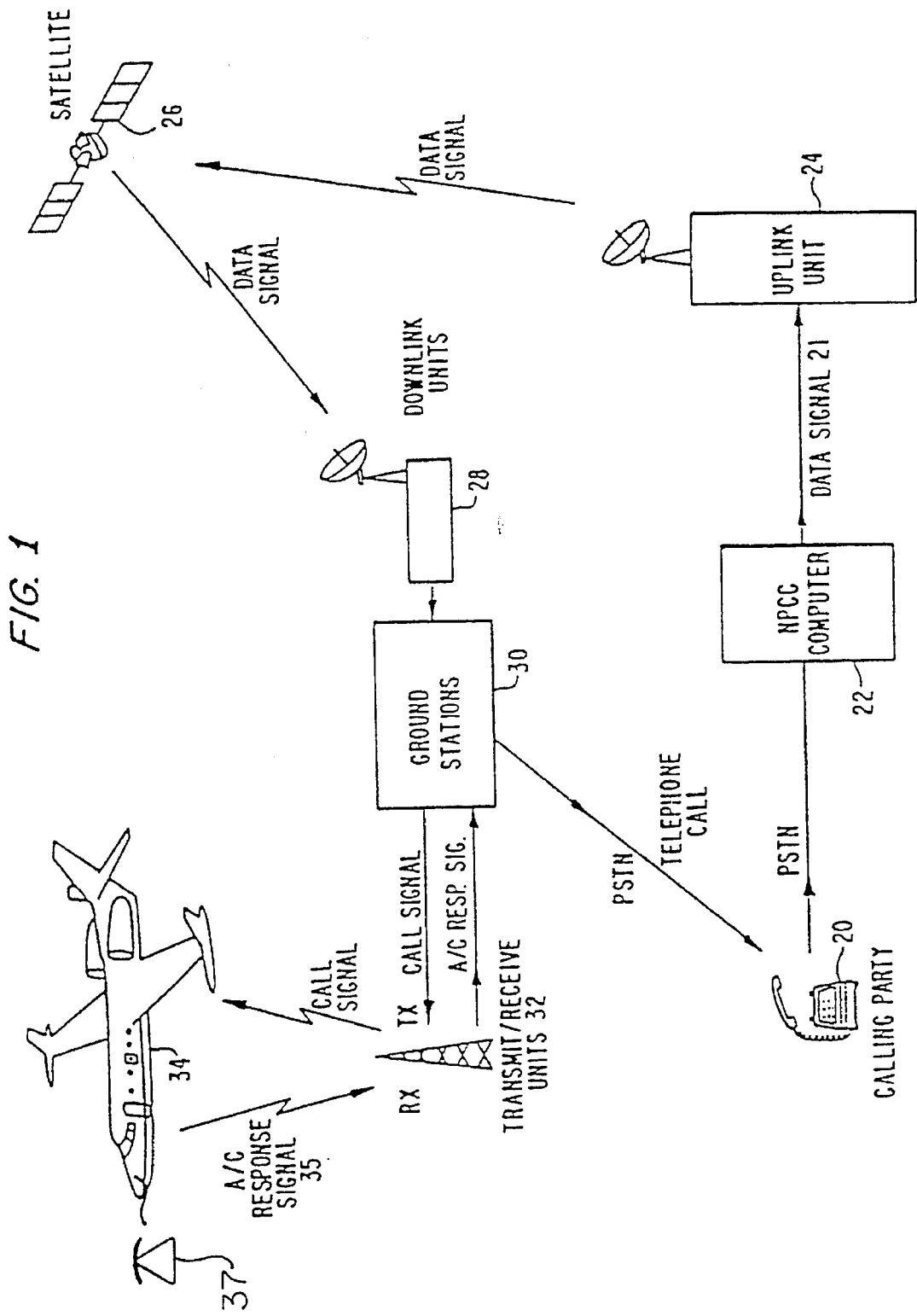
FIG. 1 is a general block diagram of a presently preferred embodiment of a ground-to-air telephone calling system incorporating the teachings of the present invention.

Referring now to FIG. 1, there is shown a generalized block diagram illustrating a ground-to-air telephone calling system incorporating the teachings of the present invention. The system of FIG. 1 includes a telephone 20, a national paging control computer (NPCC) 22, an uplink unit 24, a satellite 26, a plurality of downlink units 28, a plurality of ground stations 30, a plurality of transmit/receive units 32, and an aircraft 34 having an airborne telephone 37 thereon.

Telephone 20 is coupled to the input of NPCC computer 22 via the public switched telephone network (PSTN). The output of NPCC computer 22 is coupled to the input of uplink unit 24 and passes a data signal 21 thereto.

Uplink unit 24, satellite 26, downlink units 28, ground stations 30, and transmit/receive units 32 form a signal transmitting and receiving network which covers any preselected geographic region. Data signal 21 is subsequently uplinked by uplink unit 24 to satellite 26 which transmits data signal 21 to downlink units 28. The output of each downlink unit 28 is coupled to an input of a corresponding ground station 30. Ground stations 30 receive data signals 21 from downlink units 28. An output of each ground station 30, i.e., a call signal 31, is coupled to an input of a corresponding transmit/receive unit 32. Each transmit/receive unit 32 subsequently transmits call signal 31 to possible aircraft locations. If the airborne telephone 37 on aircraft 34 receives a call signal from any transmit/receive unit 32, then an aircraft response 35 is formed and transmitted from the airborne telephone to the transmit/receive unit 32 from which the call signal was received. Aircraft response signal 35 is then passed from an output of transmit/receive unit 32 to an input of the corresponding ground station 30. Ground station 30 is coupled to the calling party over the PSTN.

In accordance with the teachings of the present invention, the calling party, via telephone 20, initiates a telephone call to NPCC computer 22. After receiving the telephone call, NPCC computer 22 then prompts the calling party to input an air-ground radiotelephone automated service (AGRAS) number, representing an identification number of the airborne telephone to be called. NPCC computer 22 further prompts the calling party to input a call-back number to which a subsequent telephone call can be placed to reach the calling party. After input of this information via telephone 20 over the PSTN, the calling party then hangs up his telephone.

NPCC computer 22 automatically generates data signal 21, which includes the call-back number, and passes data signal 21 to uplink unit 24 via standard techniques, i.e., land lines, microwave transmissions, etc. The format of data signal 21 fully comports with established protocol filed with the FCC and will be discussed below in more detail in connection with FIGS. 3a–3c. Uplink unit 24 then transmits data signal 21 to satellite 26 in a conventional manner. Likewise, data signal 21 is reflected by satellite 26 to downlink units 28, as is known in the art. Each down link unit 28 has associated with it a corresponding ground station 30 and transmit/receive unit 32. Preferably, down link units 28 are distributed nationwide, thus providing nationwide ground-to-air calling ability. The structure and function of ground stations 30 will be discussed below in more detail in connection with FIG. 2.

Data signal 21 received from satellite 26 by downlink unit 28 is automatically passed to ground station 30. Ground station 30 receives and unpacks data signal 21 and outputs call signal 31, which comprises the AGRAS number and a ground station identification number. Each ground station is assigned to a unique ground station identification number and, therefore, each call signal 31 output from a ground station 30 is unique. Each call signal 31 is transmitted by its corresponding transmit/receive unit 32.

If aircraft 34 is within transmission range of a particular transmit/receive unit 32, then the call signal transmitted by that transmit/receive unit will be received by the airborne telephone on aircraft 34. In response thereto, the airborne telephone forms and transmits aircraft response signal 35 on the same frequency channel on which call signal 31 was received, i.e., to the same transmit/receive unit 32 which transmitted the call signal received. Aircraft response signal 35 is passed from transmit/receive unit 32 to its corresponding ground station 30. In response to aircraft response signal 35, ground station 30 automatically initiates a telephone call over the PSTN to telephone 20. When the calling party answers the call, the calling party is connected via ground station 30 and transmit/receive unit 32 to the airborne telephone 37 located in aircraft 34.

Figure 2:
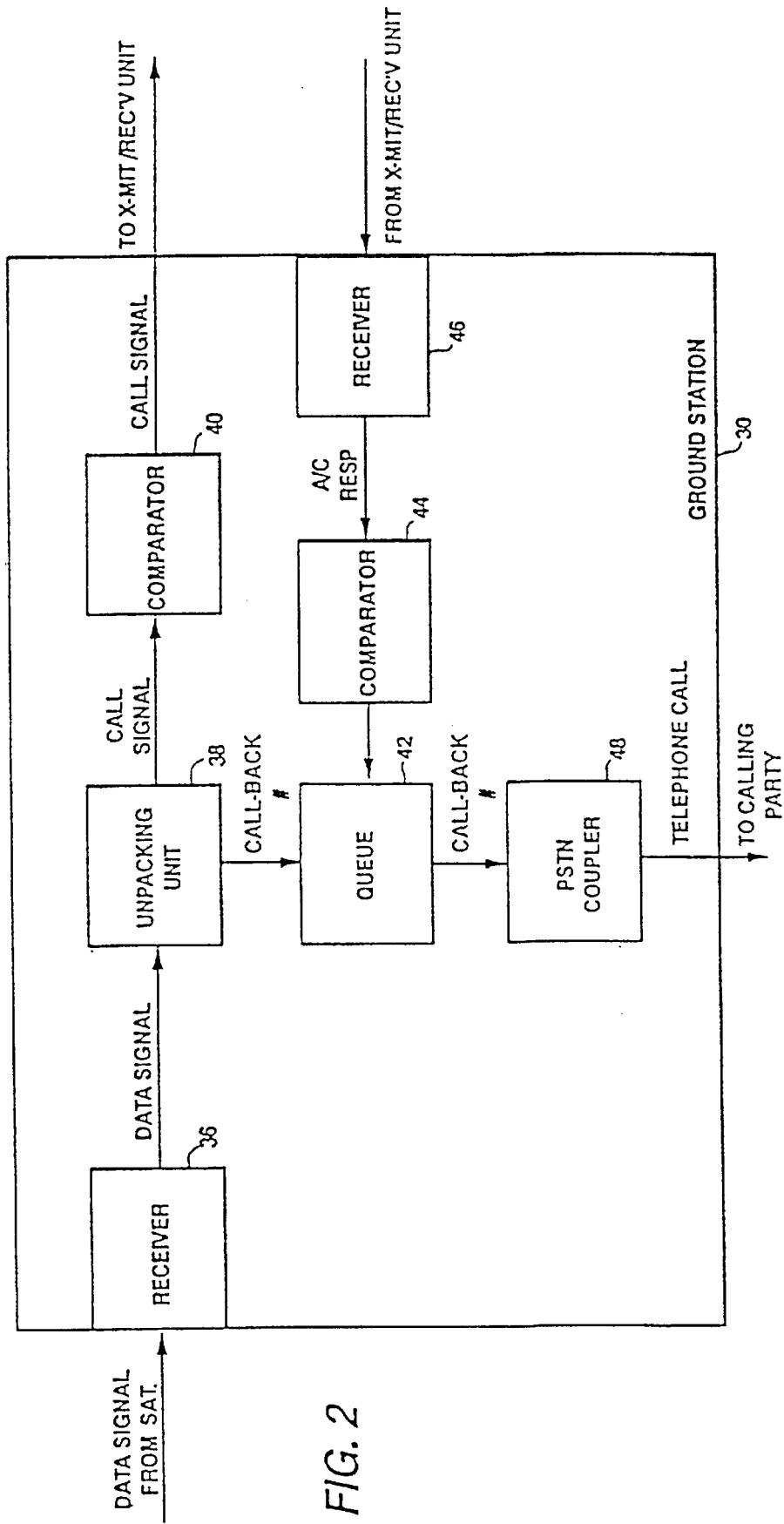
FIG. 2 is a detailed block diagram of a ground station utilized in the system of FIG. 1.
Figure 4A:
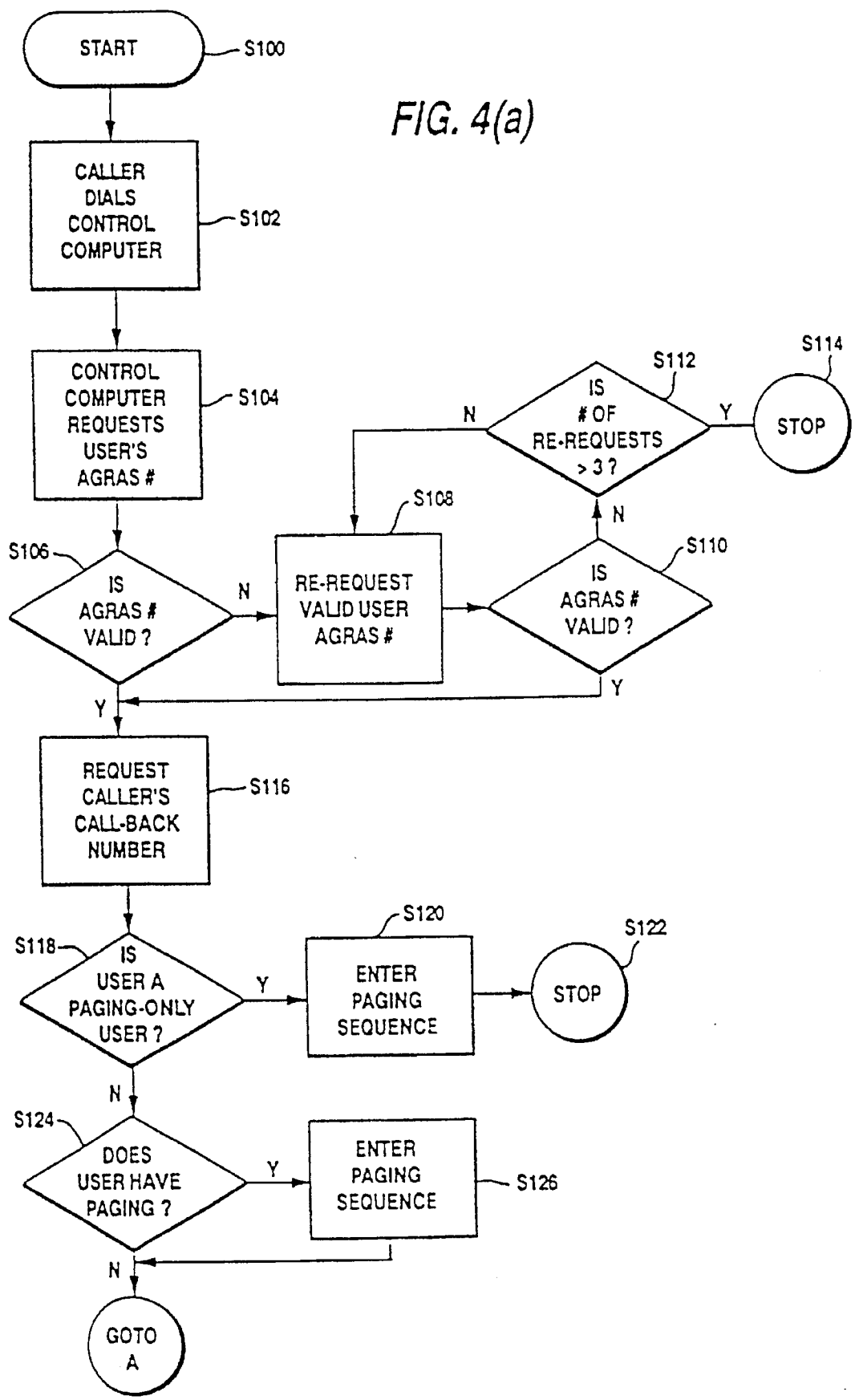
FIGS. 4a–4d are flow charts of the operation of a ground-to-air telephone system incorporating the teachings of the present invention.
Figure 4B:
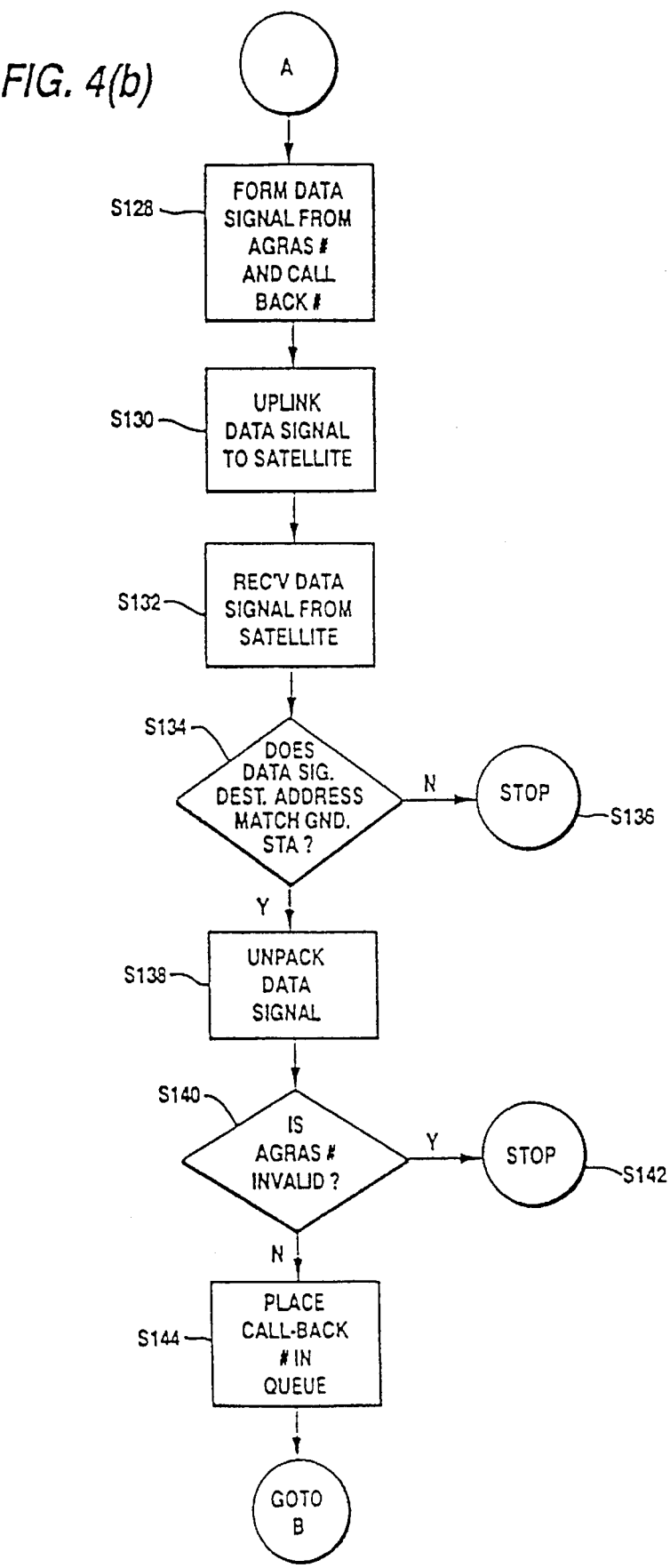
Figure 4C:
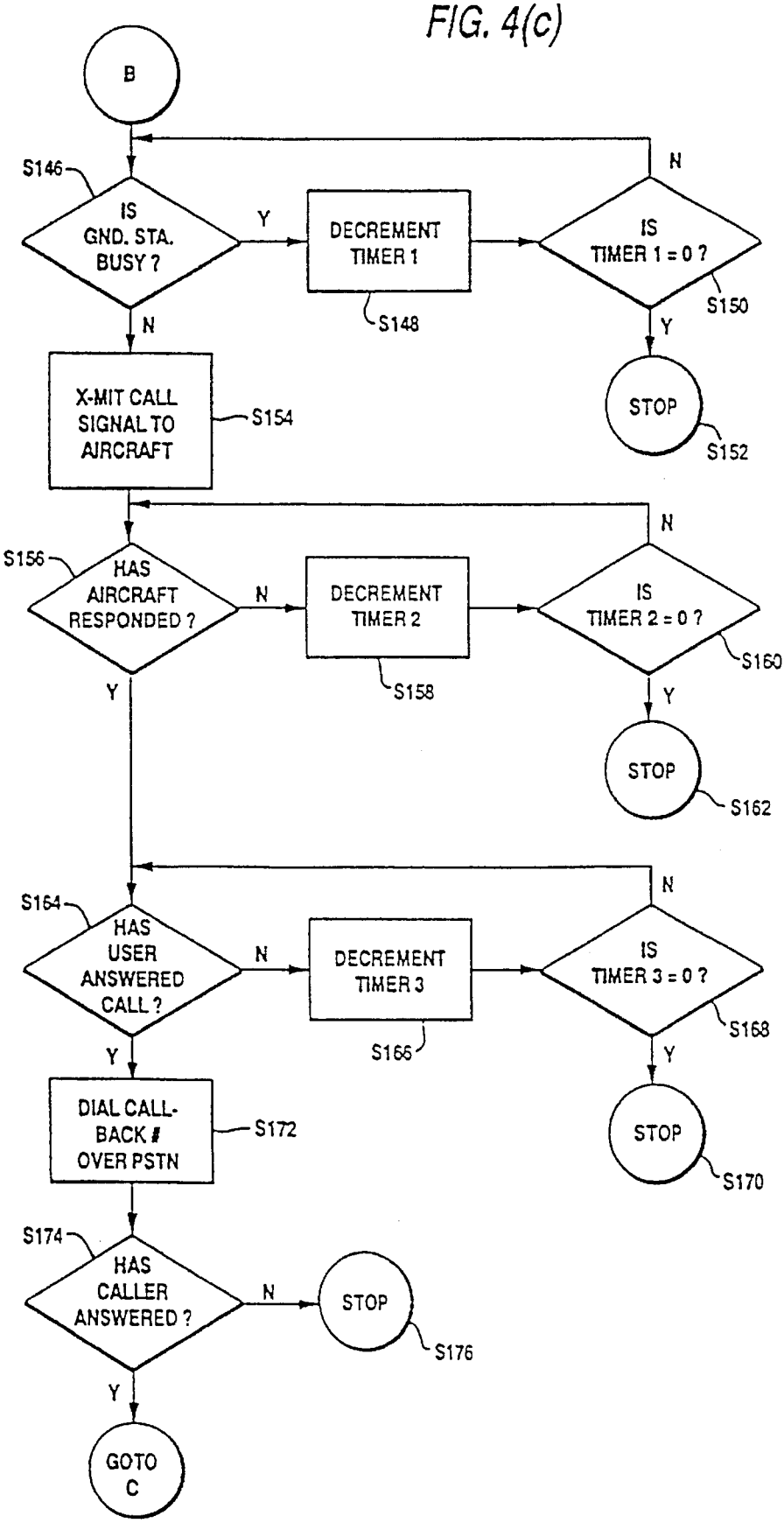
Figure 4D:
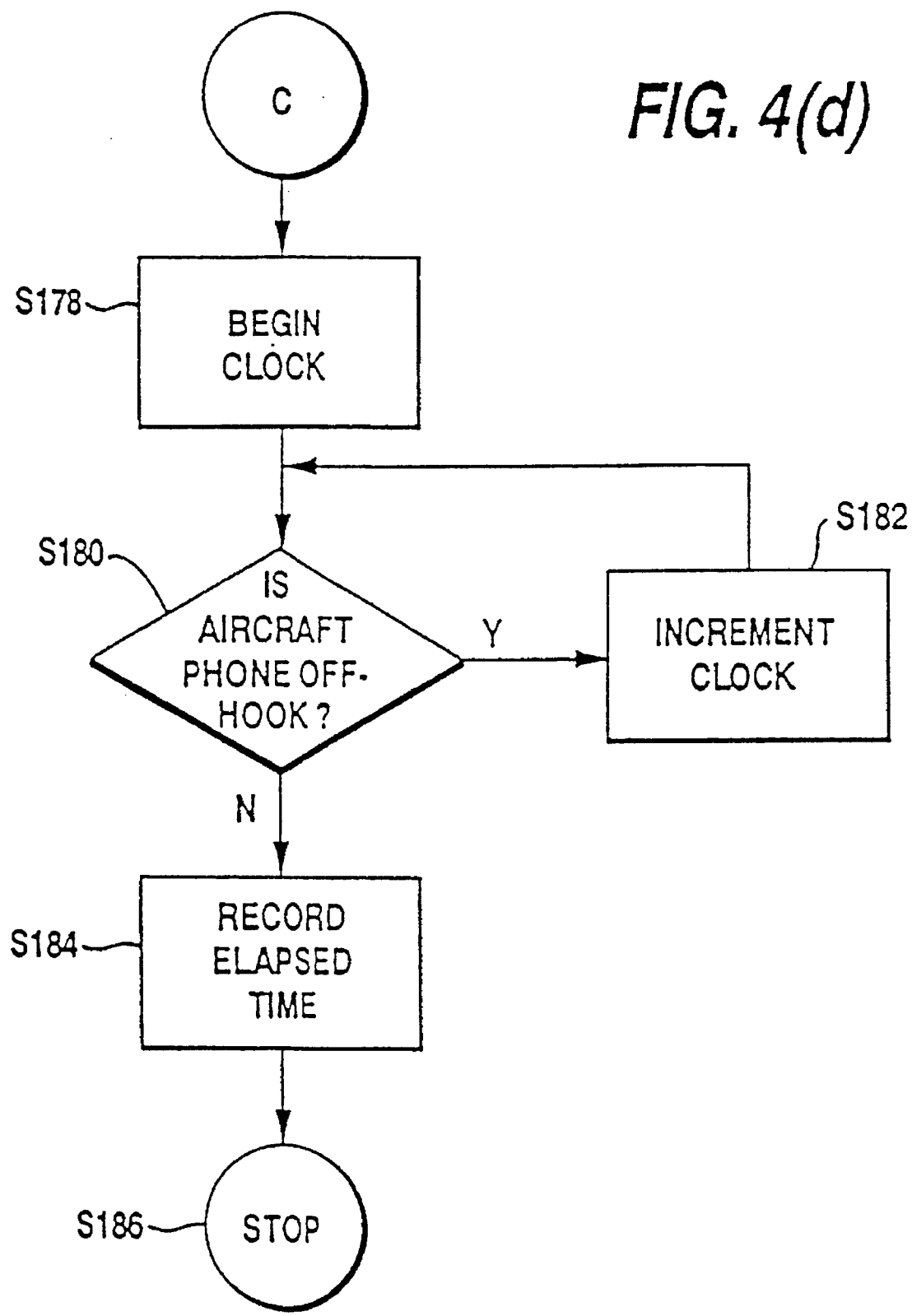

FIG. 2 is a more detailed block diagram of ground station 30 illustrated in FIG. 1. Specifically, ground station 30 includes a first receiver 36, an unpacking unit 38, a first comparator 40, a queue 42, a second comparator 44, a second receiver 46, and a PSTN coupler 48.

An input of first receiver 36 receives data signal 21 from satellite 26, as illustrated in FIG. 1. Data signal 21 is passed from an output of first receiver 36 to an input of unpacking unit 38. Unpacking unit 38 unpacks the data signal 21 and outputs the call-back number to queue 42. Unpacking unit 38 further outputs call signal 31 to first comparator 40. Call signal 31 includes the AGRAS number of the airborne telephone to be called, as well as ground station identifying information. First comparator 40 compares the AGRAS number contained in call signal 31 against a list of invalid AGRAS numbers. If the AGRAS number contained in call signal 31 is found by first comparator 40 to be not invalid (i.e. valid), then call signal 31 is output from first comparator 40 to a corresponding transmit/receive unit 32.

As described above, call signal 31 is transmitted by transmit/receive unit 32 to potential locations of aircraft 34. If aircraft 34 is within the transmission range of transmit/receive unit 32, then the airborne telephone on aircraft 34 returns aircraft response signal 35 to the same transmit/receive unit 32. Aircraft response signal 35 is output from transmit/receive unit 32 to an input of second receiver 46.

Second receiver 46 outputs aircraft response signal 35 to an input of second comparator 44 which verifies that ground station identifying information included in aircraft response signal 35 corresponds to the address of the ground station receiving the aircraft response signal. If aircraft response signal 35 has been received by the correct ground station 30, aircraft response signal 35 is output from second comparator 44 to an input of queue 42. Queue 42 then outputs the call-back number to an input of PSTN coupler 48 which initiates a telephone call to the calling party over the PSTN.

The formats of various signals used in the ground-to-air telephone calling system of the present invention will now be described in detail in connection with FIGS. 3a–3c. As shown in FIG. 3a, data signal 21 includes a start-of-header (SOH) flag 50, a header 52, a start-of-text (STX) flag 54, data blocks 56, and end flag (ETX) 58, and cyclic redundancy check code (CRC) 60.

SOH flag 50 preferably comprises one byte of data and identifies the beginning of header 52. Header 52 indicates the source and destination of each data block 56 and is described in more detail below in connection with FIG. 3b. STX flag 54 preferably comprises one byte of data and identifies the beginning of data blocks 56. Data blocks 56 are discussed in more detail below in connection with FIG. 3c. ETX flag 58 preferably comprises one byte of data and identifies the end of data blocks 56. CRC 60 preferably comprises two bytes of data which check for errors in the format of data signal 21.

As shown in FIG. 3b, header 52 includes a destination address 62, an inertia field 64, a source address 66, and a serial number 68. Destination address 62 preferably comprises four bytes of data allowing for the identification of 65,535 possible destination addresses identifying ground stations selected to receive data signal 21. By varying destination address 62, regional programmability of ground stations may be achieved. Inertia field 64 preferably comprises two bytes of data and represents a value used to determine whether a particular data signal 21 is still valid. Source address 66 preferably comprises four bytes of data representing a source address within NPCC computer 22. Serial number 68 preferably comprises two bytes of data and is used to uniquely identify a particular data signal 21 in order to prevent redundant transmission.

As illustrated in FIG. 3c, data block 56 is of a variable length and includes a data block type field 70, a page type field. 72, a page class field 74, an RF channel designator field 76, an RF zone designator field 78, a function code field 80, a cap code field 82, a message text field 84, and an end-of-block (ETB) field 86.

Data block type field 70 preferably comprises one byte of data and describes the format of data block 56. Page type field 72 preferably comprises one byte of data and describes a signalling code used with the particular AGRAS number being called. Page class field 74 preferably comprises one byte of data and describes the message and coding class of the airborne telephone identified by the particular AGRAS number. RF channel designator field 76 preferably comprises one byte of data identifying the particular channel frequency used by transmit/receive unit 32. RF zone designator field 78 preferably comprises one byte of data and identifies the particular frequency zone within the channel identified by RF channel designator field 76 in which transmission by transmit/receive unit 32 will occur. Function code field 80 preferably comprises one byte of data and identifies the priority of call signal 31. Cap code field 82 preferably comprises eight bytes of data and identifies the specific type of airborne telephone identified by the AGRAS number. Message text field 84 is of variable length and consists of characters identifying the AGRAS number and call-back number input by the calling party to NPCC computer 22. ETB field 86 identifies the end of message text field 84.

The operation of the system of FIG. 1 will now be described with reference to the flow charts of FIGS. 4a–4d. In order to initiate a ground-to-air telephone call using the system of FIG. 1, the calling party dials NPCC computer 22 over the PSTN in step S102. In response to the call, NPCC computer 22 requests the AGRAS number of the airborne telephone to be called. The calling party then inputs, via telephone 20, the AGRAS number of the airborne telephone in step S104. NPCC computer 22 then checks the validity of the AGRAS number input in step S106 and, if the AGRAS number is found to be invalid, re-requests a valid AGRAS number from the calling party in step S108. If the calling party fails to input a valid AGRAS number in three attempts, operation of the system is terminated, as shown in steps S110, S112, and S114. If a valid AGRAS number has been input by the calling party, NPCC computer 22 then requests a call-back number in step S116. After inputting the call-back number, the calling party then hangs up.

Next, in step S118, NPCC computer 22 determines from the valid AGRAS number whether the AGRAS number identifies a paging-only user. This step is desired because a common AGRAS number may preferably be used to identify an airborne telephone and/or a paging unit (not shown). The user has the option of selecting whether his AGRAS number is valid for an airborne telephone, paging unit, or both. If the user is a paging-only user, then the user is paged using a known paging sequence (step S120), and the operation is terminated (step S122). If the determination in step S118 is that the user is not a paging only user, thus indicating that the AGRAS number corresponds to an airborne telephone, it is next determined, in step S124, whether the user's AGRAS number permits paging, or is limited to an airborne telephone. If it is determined that the AGRAS number also corresponds to a pager, a known paging sequence is initiated in step S126.

Next, from the AGRAS number and call-back number input by the calling party to NPCC computer 22, data signal 21 is formed (step S128). Data signal comports with existing protocol filed with the FCC and is uplinked from uplink unit 24 to satellite 26 (step S130) and is subsequently received by each downlink unit 28 (step S132). After data signal 21 is received by downlink units 28, it is determined whether the destination address 62 of data signal 21 corresponds to the ground station 30 associated with downlink unit 28. If destination address 62 does not correspond to ground station 30, i.e., ground station 30 is not located in a selected region, then operation is terminated (step S136). Otherwise, operation continues and data signal 21 is unpacked by unpacking unit 38 (step S138). In step S140, it is determined whether the AGRAS number unpacked by unpacking unit 38 is invalid. This step is performed to ensure that no transmission errors or skewing of data has occurred. If the AGRAS number is not invalid, then the call-back number is passed from unpacking unit 38 to queue 42 (step 144). In step 146 it is determined whether ground station 30 is busy, i.e., it is determined whether that particular ground station is already in communication with an airborne telephone. If ground station 30 is busy, then operation passes to a first timing circuit represented by step S148, S150, and S152 in which a first timer is decremented, it is determined whether the first timer has elapsed, and it is again determined whether ground station 30 is busy. This process preferably repeats for a period of approximately 90 seconds in order to maximize the possibility that ground station 30 becomes available to subsequently pass call signal 31 to transmit/receive unit 32. If ground station 30 remains busy, then operation of the system terminates. If ground station 30 is not initially busy in step S146, or ground station 30 has become available during the decrement of the first timing circuit, system operation proceeds to step S154 in which call signal 31 is passed from ground station 30 to transmit/receive unit 32, which subsequently transmits call signal 31 to the airborne telephone on aircraft 34. If aircraft 34 is within transmission range of a particular transmit/receive unit 32, the airborne telephone will respond to call signal 31 with aircraft response signal 35. If the airborne telephone does not respond initially to call signal 31, then a second timing circuit is entered in which the airborne telephone is allowed a predetermined period of time to respond to call signal 31. If the airborne telephone on aircraft 34 does not respond to call signal 31 within the allotted time, then operation is terminated in step S162. If the airborne telephone responds to call signal 31 by transmitting aircraft response signal 35 to transmit/receive unit 32, then the airborne telephone will begin to ring. It is then determined in step S164 whether the airborne telephone has been answered, i.e., it is determined whether the receiver of the airborne telephone has gone off-hook.

The user of the airborne telephone is given a predetermined amount of time, as shown in steps S166, S168, and S170, in which to answer the airborne telephone. If the user answers the airborne telephone within this time, then PSTN coupler 48 in ground station 30 initiates a telephone call to the call-back number stored in queue 42 over the PSTN (step S172). If the calling party answers (step S174), then a clock is initiated in order to record the length of the call for billing purposes. As long as the airborne telephone is off-hook (step S180) the clock is incremented (step S182). When the user of the airborne telephone hangs up, then the elapsed time of the telephone call is recorded for billing purposes (step S184) and operation of the system is terminated (step S186).

The ground-to-air telephone calling system and related method of the subject invention thus provide a combination of features which permit a ground based calling party to establish telephonic communication with an airborne telephone of unknown location. This aspect of the system of the present invention provides a distinct improvement over prior art airborne telephone systems. Moreover, all signals used by the system of the present invention fully comply with existing protocol filed with the FCC.

The embodiment of FIG. 1 provides a ground-to-air telephone calling system and method for an aircraft having a single telephone; however, most commercial aircraft have more than one telephone. For example, some commercial airlines equip each first class seat of some airplanes with a telephone. It is foreseeable, that in the future every seat on an airplane will have its own telephone, or a telephone will be assigned for a predetermined block of seats. The present invention can also accommodate such a multi-telephone configuration on board an aircraft.

Figure 5:
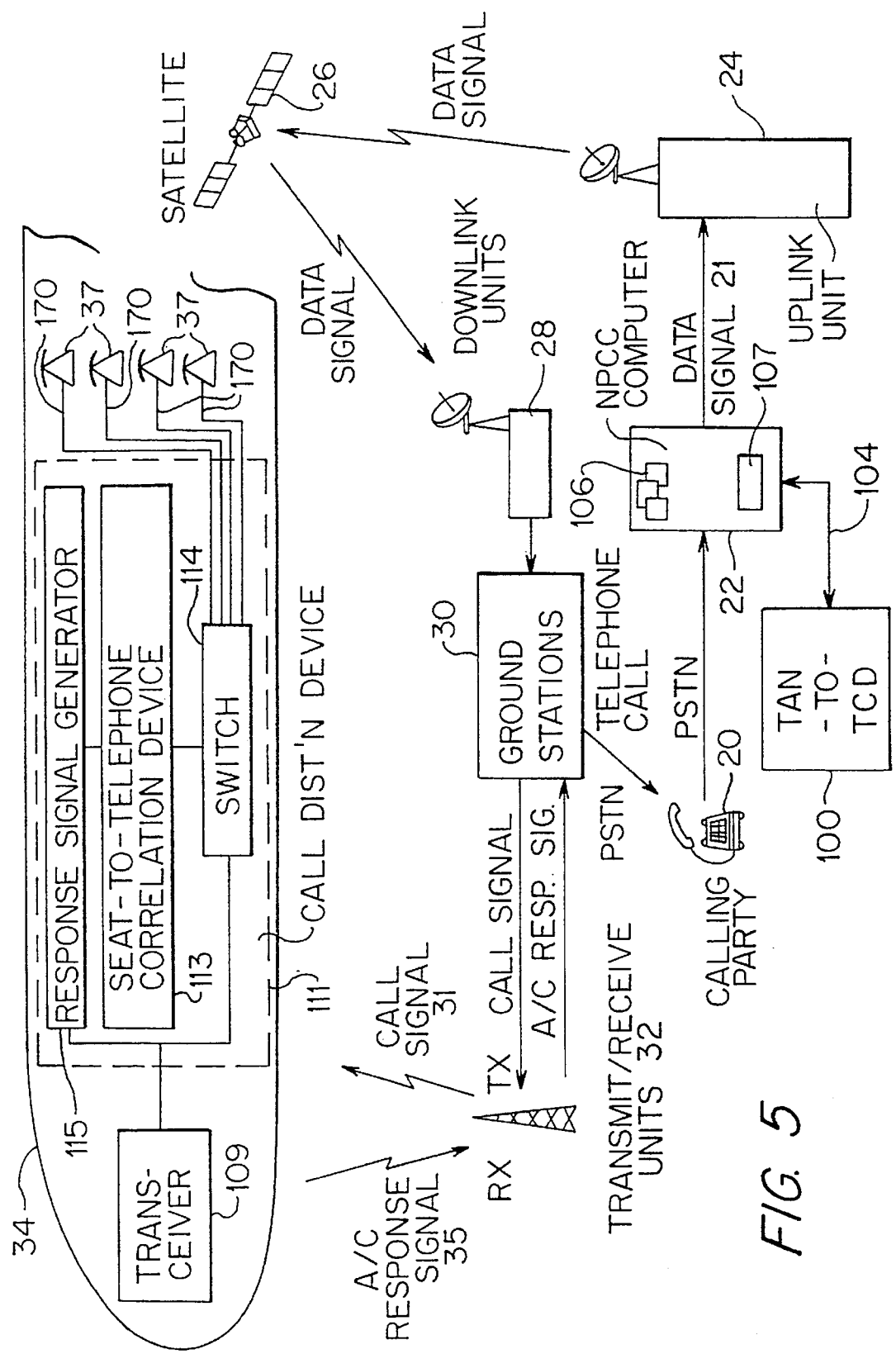
FIG. 5 illustrates a ground-to-air telephone system which includes a plurality of telephones on an aircraft in accordance with another embodiment of the present invention.

FIG. 5 illustrates an alternative embodiment of a ground-to-air telephone system which includes a plurality of telephones on an aircraft. This embodiment is capable of directing a call to a particular telephone assigned to a passenger on the aircraft. For example, in one embodiment in which a telephone is provided for each seat on an airplane, a call to a passenger is routed directly to the telephone at the passenger's seat.

In this multi-telephone embodiment, subscribers to the ground-to-air telephone service are assigned a unique traveler assigned number (TAN) by a service operator. The TAN may be, for example, the subscriber's social security number, frequent flyer number, or any code or identifier sufficient to uniquely identify that subscriber. Also, each aircraft participating in the service is assigned a unique aircraft identification number (AIN), which may comprise any code or identifier sufficient to uniquely identify that aircraft.

The embodiment of FIG. 5 is similar to the embodiment of FIG. 1, but further includes a TAN-to-telephone correlation device (TAN-to-TCD) 100 on the ground, and a transceiver 109, a call distribution device 111, and a plurality of telephones 37 on the aircraft 34. In this preferred embodiment, TAN-to-TCD 100 is located at airline ticket counters of airports corresponding to geographic regions in which the telephone service of the present invention is offered. The telephones 37 may be distributed throughout the aircraft in any manner; for example, one telephone for each seat, one telephone for each row or block of seats, or one telephone at the front of the aircraft and one at the rear of the aircraft.

Upon check-in at a ticket counter (not shown), an operator (not shown) enters into the TAN-to-TCD 100 the subscriber's TAN and seat assignment on the aircraft and the aircraft's AIN. (Henceforth, the subscriber is referred to as a "passenger.") The ticket counter operator may also enter the times that the passenger is scheduled to be in the assigned seat (typically the scheduled flight time) for reasons described below.

The TAN-to-TCD 100 forwards the foregoing information to the NPCC computer 22 via connection 104. The NPCC computer 22 builds a passenger record 106 for the passenger, which includes the passenger's TAN and seat assignment information and the aircraft's AIN, and administers the telephone service for the passenger during his or her flight.

Receiver/transmitter 109 on board aircraft 34 is capable of receiving RF call signal 31 and transmitting RF A/C response signal 35. Receiver/transmitter 109 preferably comprises a multichannel digital RF receiver/transmitter in compliance with the 800 MHz system mandated by the FCC.

Call distribution device 111 is connected to each telephone. 37 on aircraft 34 via connections 120. Call distribution device 111 includes response signal generator 115, seat-to-telephone correlation device 113, and switch 114. Response signal generator 115 responds to the AIN in the received call signal 31 and generates A/C response signal 35 if the AIN corresponds to that aircraft. Seat-to-telephone correlation device 113 correlates each seat on the aircraft with a particular telephone on the aircraft. For example, if each seat on the aircraft is equipped with a telephone, there is a one-to-one correspondence between the seats and telephones. If, however, there is one telephone for a plurality of seats, for example, one row of three seats 122a–c as shown for example in FIG. 6A, seat-to-telephone correlation device 113 correlates those three seats 122a–c to a particular telephone 37a, which may be conveniently located with respect to all three seats 122a–c. Alternatively, as shown in FIG. 6B, a telephone 37b corresponding to a plurality of seats may be locate at a predetermined area of the aircraft 34 where it can be conveniently manned by an aircraft employee (not shown). Switch 114 establishes a connection between the caller and the corresponding telephone 37. Call distribution device 111 may comprise, for example, the Airborne telecommunications system, manufactured by AMBIT Systems, Inc., programmed to provide the described correlating and distribution functions.

Figure 7A:
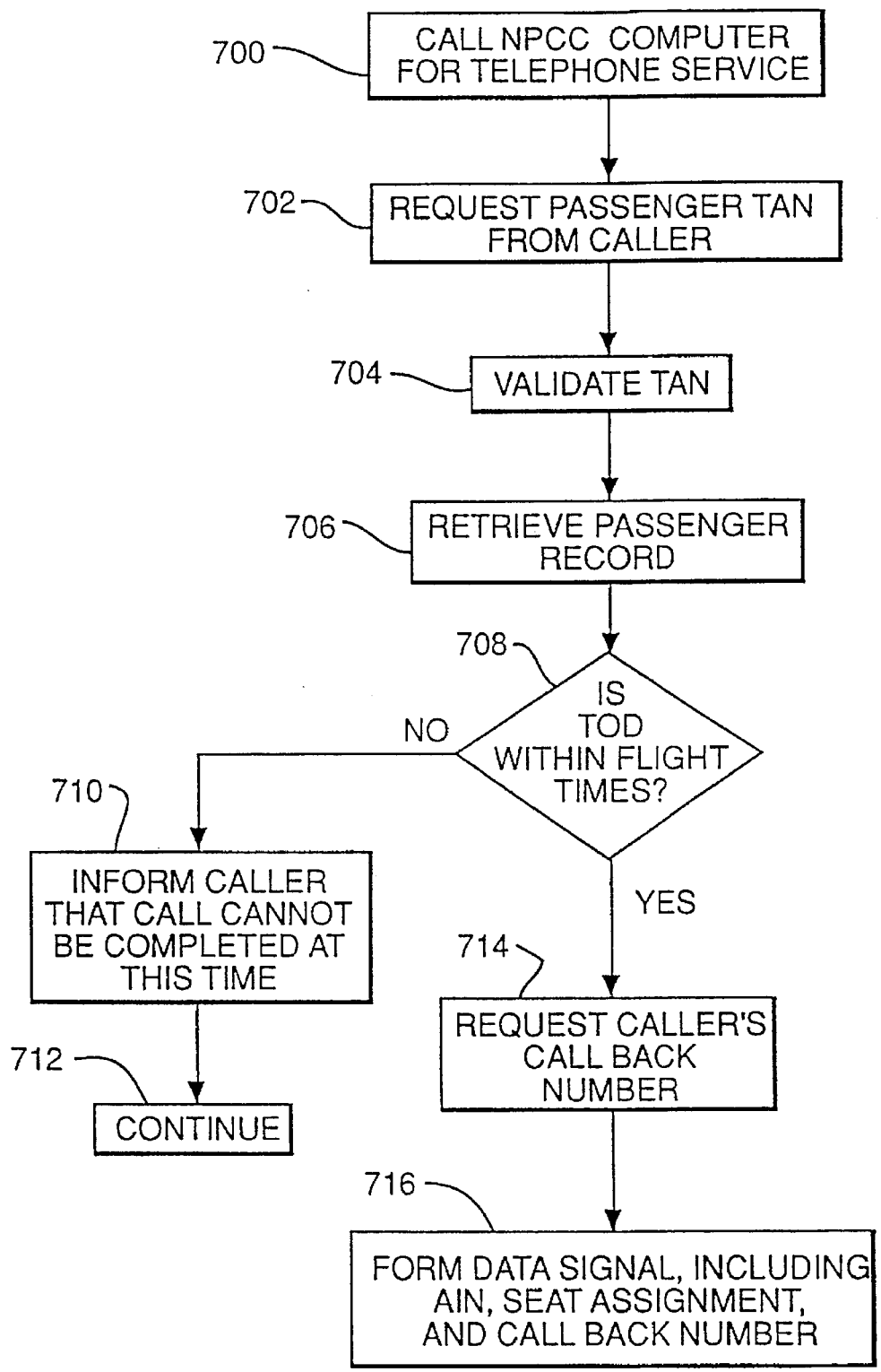
FIG. 7A is a flow diagram illustrating the operation of a ground-to-air telephone system in accordance with one embodiment of the present invention.

FIG. 7A is a flow diagram illustrating the operation of the system to formulate a telephone call. As in the single-telephone embodiment, in the multi-telephone embodiment, a calling party 20 initiates a call to the passenger by calling the NPCC computer 22 via the PSTN (step 700). In the multi-telephone embodiment, however, a voice prompt device 107 within the NPCC computer 22 prompts the calling party 20 to input the passenger's TAN (step 702). The NPCC computer may then validate the TAN (step 704) in a manner similar to the validation of the AGRAS number shown in steps S106–S114 of FIG. 4a. If the TAN is valid, the NPCC computer 22 retrieves the passenger record 106 corresponding to the TAN (step 706). Using the flight time information in the passenger record 106, the NPCC computer 22 compares the flight time of the passenger's flight with the current time of day (step 708). If the caller has called during a time outside the flight time of the passenger, the NPCC computer 22 informs the caller that the call cannot be completed at this time, or provides some other appropriate message (step 720), and continues with normal processing. If, instead, the caller has called during the passenger's flight time, the NPCC computer 22 requests the caller to input a callback number as described above with respect to the single-telephone embodiment (step 714). After inputting the requested information, the calling party 20 hangs up and awaits a return call. The NPCC computer 22 then formulates a data signal 21 from the AIN, passenger seat assignment information and the callback number (step 716).

The system operations and procedures for formulating and transmitting data signal 21, call signal 31, and A/C response signal 35 are similar to those for the single-telephone embodiment; however, in the multi-telephone embodiment, data signal 21 and call signal 31 include the AIN and the passenger's seat assignment information, and do not include an AGRAS number. Accordingly, the steps described above and shown, for example, in the flowcharts of FIGS. 4a–4d are applicable to the formulation, transmission, and reception of data signal 21 and call signal 31 and A/C response signal 35, except for the steps concerning AGRAS numbers and the herein described modifications.

Figure 7B:
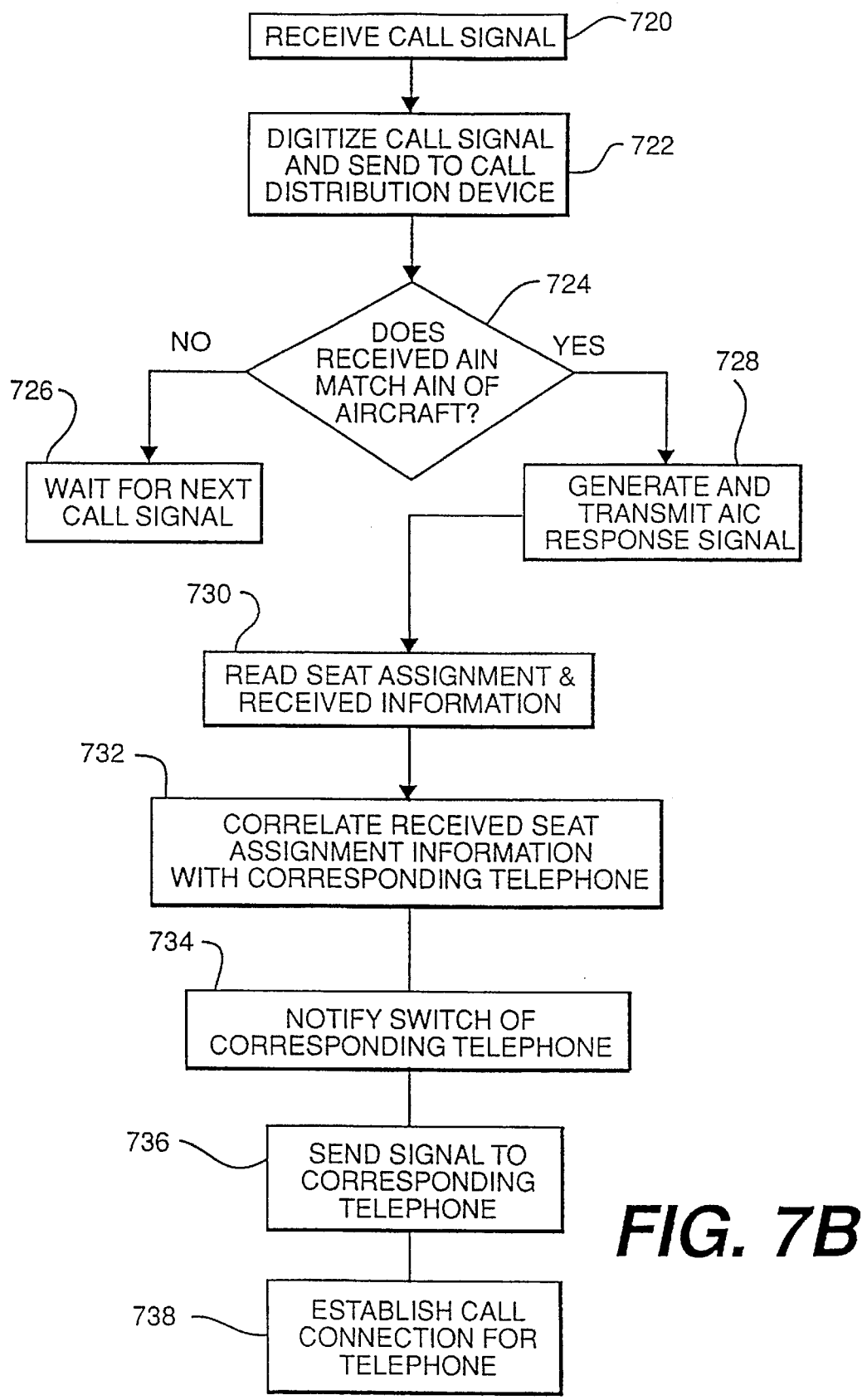
FIG. 7B is a flow diagram illustrating the operation of a transceiver and call distribution device in accordance with one embodiment of the invention.

FIG. 7B is a flow diagram illustrating the operation of transceiver 109 and call distribution device 111 for receiving and distributing calls to a passenger. Call signal 31 is received by transceiver 109, which digitizes the received RF signal and transfers the digitized call signal to response signal generator 115 of call distribution device 111 (step 722). Response signal generator 115 reads the AIN and determines whether the received AIN matches that of the aircraft (step 724). If the received AIN does not match the AIN of the aircraft, the call is not intended for a passenger on the aircraft; hence, the call distribution device 111 does not respond, but instead, awaits another call signal 31 (step 726). If, however, the received AIN matches the AIN of the aircraft, response signal generator 115 generates A/C response signal 35, which transceiver 109 transmits back to the appropriate transmit/receive unit 32, as described above with respect to the single-telephone embodiment (step 728).

Seat-to-telephone correlation device 113 of call distribution device 111, then reads the seat assignment from the digital information of the received call signal 31 (step 730), identifies which telephone 37 in the aircraft corresponds to that seat assignment (step 732), and notifies switch 114 of the telephone to be called (step 734). Switch 114 then sends a signal to that corresponding telephone to alert the passenger to the call (step 736), and establishes a call connection when the passenger picks up the phone (step 738). Each telephone is preferably allotted a separate data channel.

As described above with respect to the single-phone embodiment, preferably, the telephone connection is established when ground station 30 responds to the A/C response signal 35 by calling the queued call-back number of the caller and the caller answers the return call.

Figure 6A:
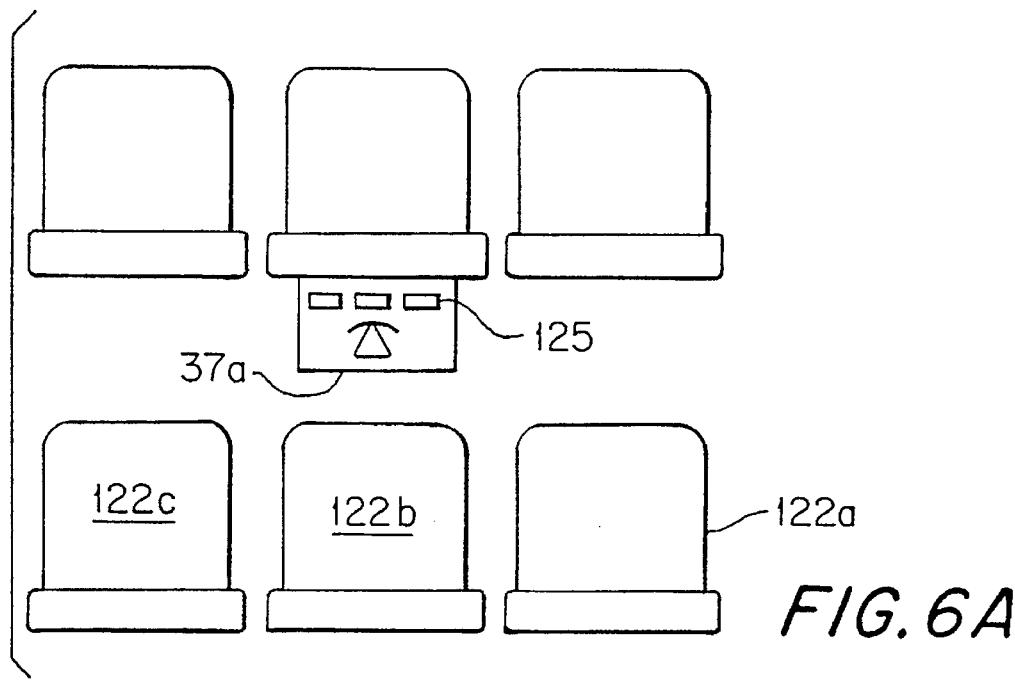
FIG. 6A illustrates an aircraft telephone/seating arrangement in accordance with one embodiment of the present invention.
Figure 6B:
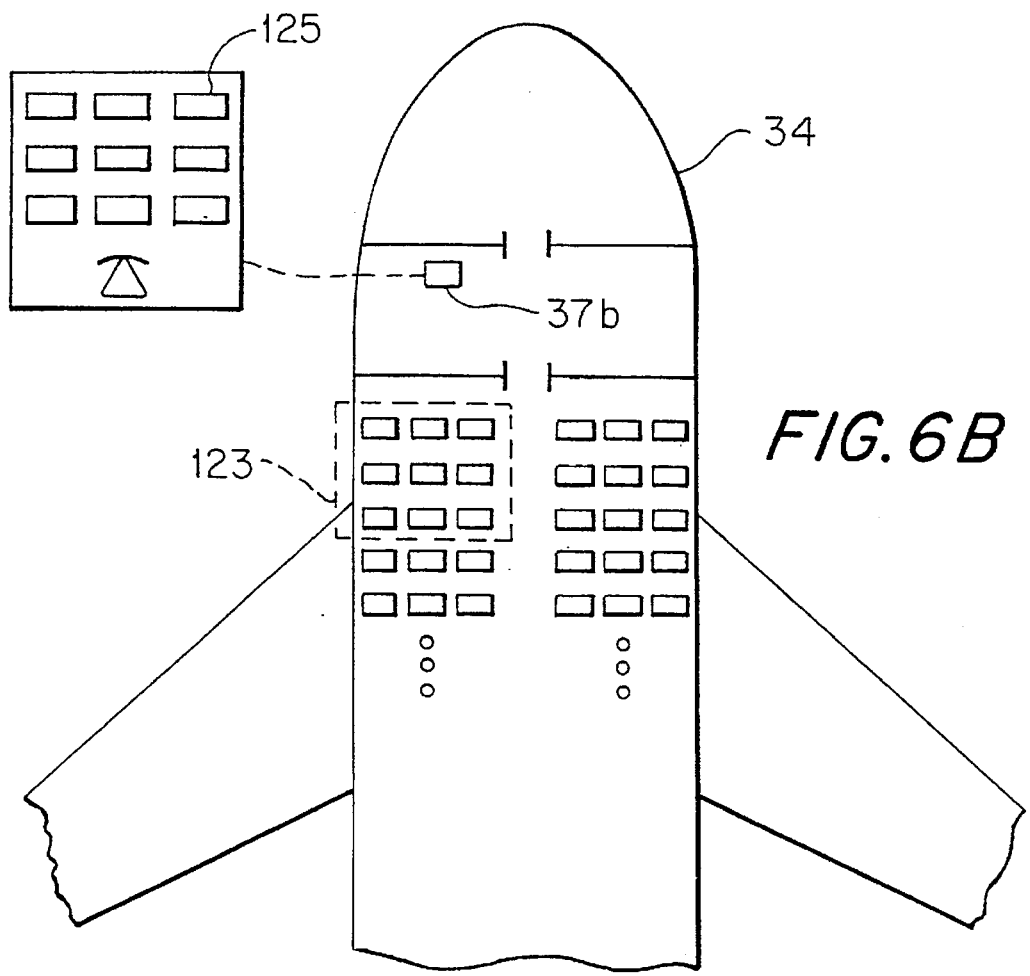
FIG. 6B illustrates an aircraft telephone/seating arrangement; in accordance with another embodiment of the present invention.

In the embodiments in which one telephone corresponds to a plurality of seats, such as those shown in FIGS. 6A and 6B, an indicator 125, such as a light panel, may be provided at the telephone 37a or 37b to identify the passenger to whom the call is directed. Each light corresponds to a particular seat.

Figure 8:
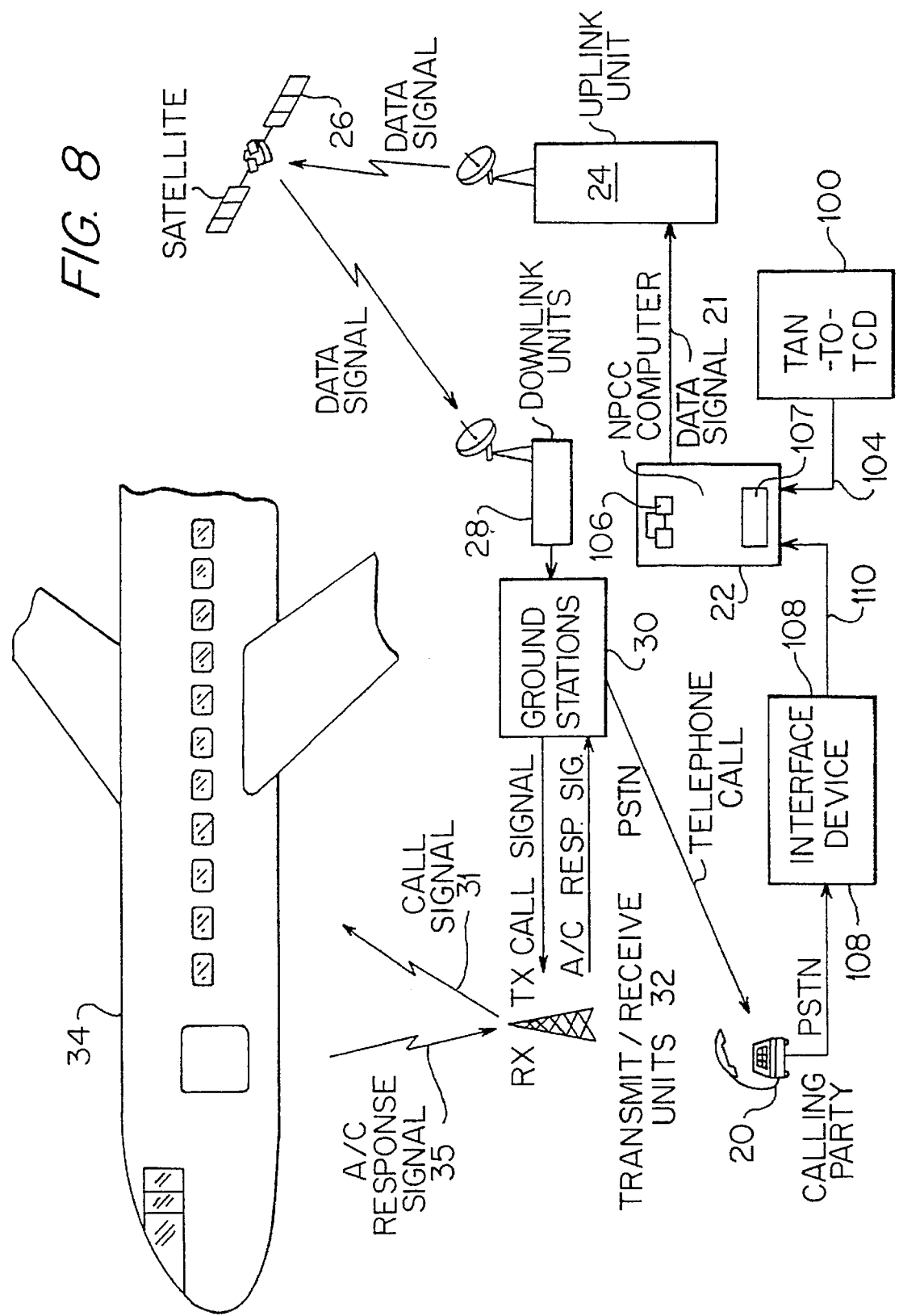
FIG. 8 illustrates a ground-to-air telephone system which includes a plurality of telephones on an aircraft in accordance with another embodiment of the present invention.

In the embodiment of FIG. 5, the calling party 20 calls directly into the NPCC computer 22 to initiate a ground-to-air telephone call. In alternative embodiments, the airline or a commercial ground-to-air service operator is equipped with an interface device to interface with the calling party 20, collect the necessary information from the calling party 20, and forward the information to the NPCC computer 22. This is shown, for example, in FIG. 8, where interface device 108 is connected to NPCC computer 22 via connection 110. Interface 108 may comprise, for example, a computerized telephone interactive and switching device, such as a call connect unit made by Advanced Interactive Systems, Inc., which can be programmed to voice prompt the calling party 20 for the necessary information and forward it to the NPCC computer 22.

While there has been illustrated and described what are at present considered to be preferred embodiments and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. For example, instead of communicating the data and call signals over a combination of land lines and satellite links as illustrated, these signals may be communicated by other means or techniques or by any combination thereof which achieves the communication speed required in ground-to-air communication. Therefore, it is intended that this invention not be limited to the particular embodiments and methods disclosed herein, but that the invention include all embodiments falling within the scope of the appended claims.

What is claimed is:

1. A system for establishing a communication link between a ground-based caller and a passenger on board an aircraft having a plurality of telephones, comprising:

a ground station, including:

a) a receiving device to receive a call for a passenger and collect the caller's telephone number, and b) signal a generator to generate a signal including the caller's telephone number;

one or more transmitters to transmit the signal over a predetermined geographic region;

a correlation device to correlate the passenger to a predetermined aircraft seat associated with a predetermined telephone;

a receiver on the aircraft to receive the signal;

an indicator on the predetermined telephone to inform the passenger of the call;

transmitting means on the aircraft for generating a response signal and transmitting the response signal to the ground station; and a dialer at the ground station to dial the caller's telephone number when the ground station receives the response signal.

2. A method of establishing a communication link between a ground-based caller and a passenger on board an aircraft having a plurality of telephones, the method comprising the steps of:

correlating the passenger to a predetermined aircraft seat having a predetermined telephone;

receiving a call for the passenger;

receiving the caller's telephone number;

transmitting a signal over a predetermined geographic region, said signal including information to alert said passenger to a call;

receiving said signal at the aircraft;

alerting said passenger via said predetermined telephone that said signal has been received;

transmitting a response signal from the aircraft to a ground station in response to said signal; and establishing a communication link between the predetermined telephone and the caller in response to the response signal.

* * * * *